United States Patent [19]

Rechen et al.

[11] Patent Number: 4,864,572
[45] Date of Patent: Sep. 5, 1989

[54] FRAMING BITSTREAMS

[76] Inventors: James B. Rechen, 7848 Briardale Ter., Derwood, Md. 20855; James D. Ewing, 11409 Brandy Hall La., Gaithersburg, Md. 20878; John G. Burgess, 10504 Walter Thompson, Vienna, Va. 22180

[21] Appl. No.: 53,823

[22] Filed: May 26, 1987

[51] Int. Cl.$^4$ .................. G06F 11/10; G08C 25/00
[52] U.S. Cl. .................................. 371/2.1; 364/900
[58] Field of Search ............... 371/32, 33, 38; 370/82, 370/86, 102; 364/200, 900

[56] References Cited

U.S. PATENT DOCUMENTS

| | | | |
|---|---|---|---|
| 3,676,846 | 7/1972 | Busch | 371/33 |
| 4,149,142 | 4/1979 | Kageyama et al. | 371/32 |
| 4,422,171 | 12/1983 | Wortley et al. | 371/32 |
| 4,489,398 | 12/1984 | Sugiyama et al. | 369/32 |
| 4,519,054 | 5/1985 | Jewer | 369/30 |
| 4,541,022 | 10/1985 | Katsuyama | 360/722 |
| 4,541,093 | 10/1985 | Furuya et al. | 371/40 |
| 4,562,577 | 12/1985 | Glover et al. | 371/38 |
| 4,575,770 | 3/1986 | Dieterich | 358/342 |
| 4,583,208 | 8/1986 | Verboom | 369/32 |
| 4,587,643 | 5/1986 | Monen et al. | 369/32 |
| 4,618,950 | 10/1986 | Abe et al. | 369/32 |
| 4,622,602 | 11/1986 | Kutaragi | 360/48 |
| 4,637,023 | 1/1987 | Lounsbury et al. | 371/38 |
| 4,646,170 | 2/1987 | Kobayashi et al. | 360/22 |
| 4,646,281 | 2/1987 | Verboom | 369/59 |
| 4,730,348 | 3/1988 | MacCrisken | 371/33 |

FOREIGN PATENT DOCUMENTS 60-256985  12/1985  Japan.

OTHER PUBLICATIONS

S. Miller and M. Collins, "Toward a Reference Model of Mass Storage Systems,", Computer, vol. 18, No. 7, pp. 9-22 (Jul. 1985).

Davies & Barber, Communication Network for Computers, John Wiley & Sons, 1973, pp. 246-248, 300-304, 375-381.

Primary Examiner—Charles E. Atkinson
Attorney, Agent, or Firm—Finnegan, Henderson Farabow, Garrett & Dunner

[57] ABSTRACT

A method for formatting data is disclosed in which a bitstream containing a very large number of bits is divided into a number of frames all of which are the same size except for a last frame which can have a smaller size than the other frames. Each frame has a frame header and a data portion and the data portion can include a number of records which each contain a record header and data portion. A frame directory specifies certain parameters for all frames of a bitstream.

42 Claims, 3 Drawing Sheets

FRAME DIRECTORY

FRAMING BITSTREAMS

BACKGROUND OF INVENTION

The present invention relates to the field of storage techniques generally, and in particular, to the field of storage of very large amounts of data In many applications there is a need to store extremely large amounts of data containing, for example, gigabits (one billion bits) or terabits (one trillion bits). This need could arise when maintaining archives or storing image data. Technological advancements in the magnetic memories and optical disks now provide media and drive systems upon which such large amounts of data can be stored Techniques for storing such large amounts of data easily, however, have generally not kept pace with technological advancements in the storage devices.

A recent article addressing the problems of mass storage systems discusses several different techniques for storing large amounts of data. In that article, entitled "Toward a Reference Model of Mass Storage Systems," by Steven W. Miller and M. William Collins, Computer, vol. 18, No. 7, pp. 9–22 (July 1985), the authors describe several prior art approaches to mass storage and discuss the reasons why those approaches have led a declining vendor interest in mass storage systems.

The authors define mass storage systems (also called "MSS") as secure places to back up or retain files which are capable of serving multiple dissimilar host processors. To counter the declining interest in such systems, the authors propose a reference model MSS. Perhaps the major design goal of the authors was a system which could store named bitstreams free of constraints imposed by the size or structure of the file management systems of the computer generating the bitstreams. To meet that and other design goals, the authors determined that the optimum method of storage for mass storage systems would be a single bit file or bitstream with no internal file structure. The reasons for selecting such a bitstream are explained in detail in the article as are the methods of implementing the model.

The mass storage industry has generally followed the recommendations in the article, and the recent trend is toward to use of bitstreams with no internal structure, rather than file management systems. The use of unformatted bitstreams, however, has laid bare their limitations. Although unformatted bitstreams do provide a degree of computer system autonomy, they also contain several inherent disadvantages. One major disadvantage is data loss from errors. In the reference model, any uncorrectable error in the bitstream renders the entire bitstream unusable. Loss of data from errors is an even bigger problem for long term storage, for example, on optical disks. Optical disks can provide data storage for several years, and the chances of data loss are higher than magnetic disks.

Furthermore, in order to use a portion of the bitstream, a host computer system must read the entire bitstream into its memory. For large bitstreams, host computer systems must devote large portions of their memory for this task even to access only a small portion of the bit file.

The disadvantages of this proposed reference model increase as the size of the bitstreams increases. Such a size increase is inevitable in most applications.

It is therefore an object of the present invention to provide a method for formatting large quantities of data which allows the data to be transported easily between different host computers, but which reduces the amount of data lost due to error.

It is a further object of the invention to provide higher data integrity for storing large quantities of data.

It is yet another object of the present invention to provide a method for storing large quantities of data in a bitstream which allows recovery of valid portions of the bitstream when only part of the string has been corrupted.

Additional objects and advantages of the present invention will be set forth in part in the description which follows and in part will obvious from that description or may learned by practice of the invention. The objects and advantages of the invention may be realized and obtain by the methods and apparatus particularly pointed out in the appended claims.

SUMMARY OF THE INVENTION

To achieve the objects and in accordance with the purpose of the invention as embodied and as broadly described herein the method of this invention of formatting a bitstream composed of a very large number of bits comprises the steps of grouping the bits from the bitstream into a plurality of sequentially organized frames of data, all of the frames having the same capacity except a last one of the frames being capable of having a smaller capacity; placing a frame header in each of the frames; placing in the frame header ID information uniquely identifying the frame containing that frame header; and providing the capability for error detection for the data in each frame independently of the data in any other frames, thereby permitting salvage of data in any frames in which errors have not been detected.

The accompanying drawings, which are incorporated herein and which constitute a part of the specification illustrate one embodiment of the invention and, together with the description explain the principles of the invention.

DESCRIPTION OF THE PREFERRED EMBODIMENT

Reference will now be made in detail to a preferred embodiment of the invention which is illustrated in the accompanying drawings.

Figure 1:
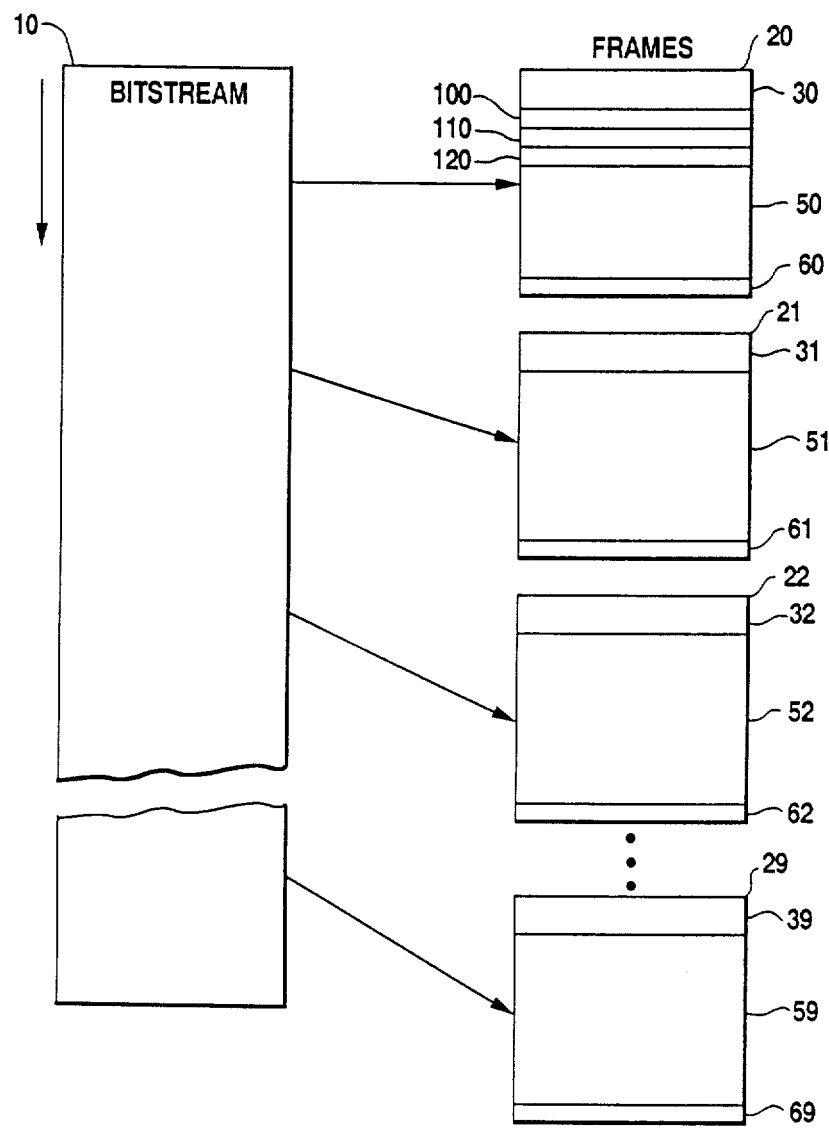
FIG. 1 is a representation of a bitstream divided into a number of frames in accordance with the present invention.

FIG. 1 shows a bitstream 10 containing a plurality of bits which are preferably sequentially organized. Bitstream 10 is typically generated by a host processor which has collected or organized the data which is placed into the bitstream. Another device, called a storage machine, is preferably used to store bitstreams from host processors in accordance with the methods of this invention.

With the present invention, it is desirable to format the data in a manner which maintains the order of the bits in the bitstream. Bitstream 10 can be treated either as a contiguous stream of bits or as an organized file structured, for example, as a number of discrete units or blocks of data. The present invention can accommodate both the contiguous bitstream or an internally organized, structured bitstream. The present invention has particular applicability to very large bitstreams, such as several gigabits or terabits, but the inventive concepts are not limited to a specific environment or bitstream size.

In accordance with the present invention, bitstream 10 is divided into a number of frames 20, 21, 22, ... 29. The numbering of the frames is not intended to limit the number of frames into which bitstream 10 may be divided. The numbering merely shows that bitstream 10 is divided into at least one frame. The number of frames used in accordance with the present invention depends on several factors such as the type and size of the bitstream 10 and of the frames.

Frames preferably have certain characteristics. For example, except for the last frame, the frames all have the same, fixed size, typically 31 kilobytes (assuming an eight-bit byte). Also, the frames are distinctly bounded and sequentially organized such that sequentially ordered frames contain sequential portions of bit stream 10.

Frames 20, 21, 22 ... 29 each include frame headers 30, 31, 32 ... 39, respectively, data areas 50, 51, 52, ... 59, respectively, and error detection or correction areas 60, 61, 62 ... 69, respectively. Preferably, each frame header 30, 31, 32 ... 39, contains a fixed format area followed by an optional variable length fill area. The frame headers are shown in more detail in FIG. 2 and are described in greater detail below.

Data areas 50, 51, 52 ... 59, preferably each contain a number of records, for example, records 100, 110, 120, ... in frame 21, which each have the same size. A typical size for each record is three kilobytes, but the size of the records may be chosen to accommodate the particular application. Each record 100, 110, 120, etc., preferably includes a record header followed by a data area. The record header for the first record preferably follows the file header.

Figure 3:
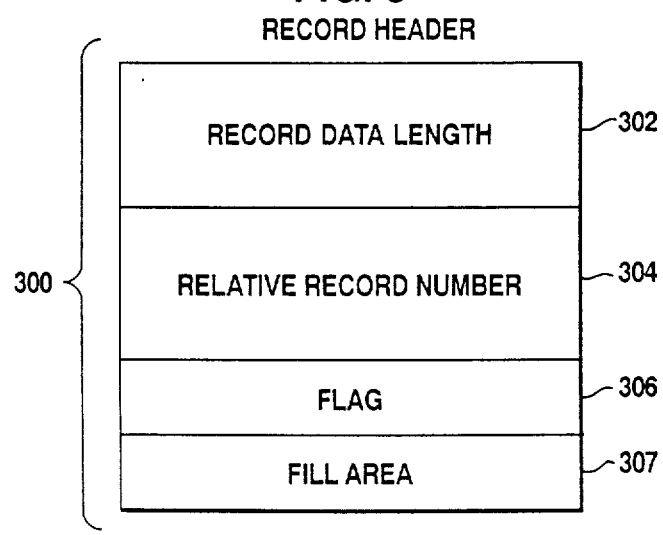
FIG. 3 is a detailed diagram of a record header.

FIG. 3 shows an example of a record header. Each record header has a fixed format, fixed length area, followed by an optional key field, and an optional fill area. The preferred embodiment of the invention is based on eight-bit bytes and the fill area may be used when host processors have a different data storage structure from that of the frames. If a host processor structures its data in subunits which are not integral divisors of the record lengths, the fill area allows the record headers and the subunits to align.

Each record header, except the first record header, preferably follows the last part of the data area of the previous record. The last record in a frame is flagged in its record header, and the area between the last record data area and the end of the frame data area can contain fill data to maintain constant frame sizes for host processors with different data structures.

The data area of the records contains the bits of the original bitstream. The records can also be organized to reflect the original organization of the bitstreams, e.g., into "blocks." The blocks, then, would be represented as one or more records, and segmentation flags in the second headers could be used to indicate block boundaries.

The data areas 50, 51, 52, ... 59 contain data from bitstream 10. Each frame 20, 21, 22 ... 29, can either contain no data (i.e., only fill bytes), one or more segments of a bitstream, one or more complete bitstreams, or one or more complete bitstreams plus a segment of a bitstream.

Error detection areas 60, 61, 62 ... 69 are preferably eight bytes long and contain codes representing the error detection or correction schemes, if any, which are chosen. Preferably, the error correction or detection codes check all the bytes in the frame, including the fill bytes, the headers, and all unused portions. Such codes, however, are not intended to be the sole error correction and detection for the storage of data. The error detection, if used, remains in the frame permanently for protection during all processing steps, including transfer and storage.

Although the framing concept does not require that error detection or correction be used, such detection or correction is strongly recommended since it provides several advantages over the use of unformatted bitstreams For example, when such frame error detection is used in accordance with the present invention, detection of an uncorrectable error will only corrupt the data in the frame containing the error; the bitstream data in the remaining frames will not be affected.

The one frame that may not be the same size as the others is the last frame of a bitstream. In FIG. 1, this is frame 29. Such frames are called "truncated" frames and occur when the number of bits of bitstream 10 is not an integral multiple of the number of bits in each frame. Truncated frames also often occur when there is data compression.

Truncated frame 29 has a standard frame header but only a single record and associated record header There is also preferably no error detection code in the truncated frames, and the length of such frames is set internally as variable.

Figure 2:
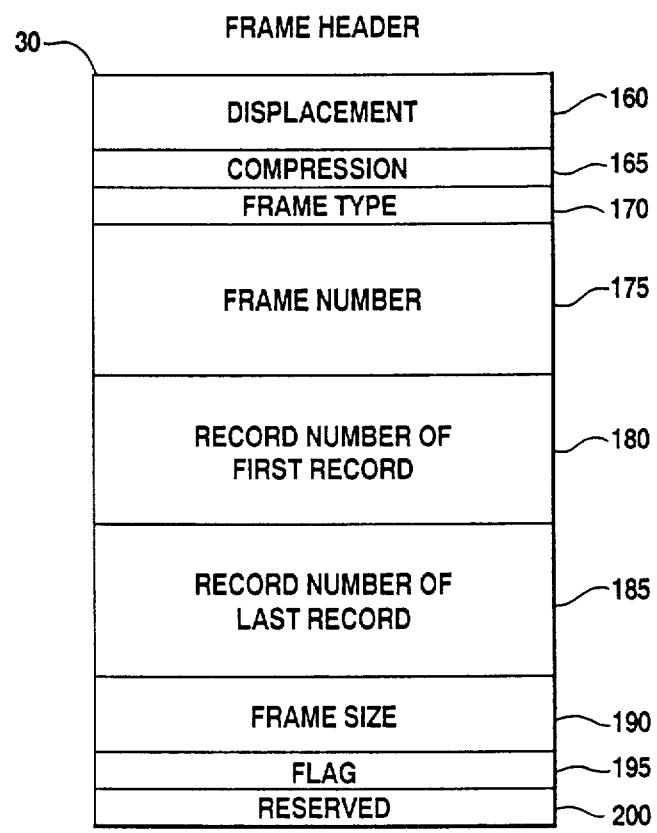
FIG. 2 is a detailed diagram of a frame header.

FIG. 2 shows a detailed representation of a frame header, e.g., frame header 30. Preferably, each frame header contains 20 bytes. The first two bytes 160 indicate the displacement to the first data byte of the first record of the frame.

The next byte 165 is a compression flag. If byte 165 is zero, there is no data compression; otherwise, there is data compression by the processor which formats the frames. Different data compression techniques can be used in accordance with the present invention.

The following byte 170 indicates the frame type. In the preferred embodiment, frames can be either complete or truncated.

The succeeding 12 bytes contain different indicators. The first set of four bytes 175 indicates the frame number within the file. The frames are preferably numbered to indicate their relative positions in the frame sequence. The frame number indicates that relative position.

The next four bytes 180 indicate the record number of the first record in the frame and the following four bytes 185 indicate the record number of the last record in the frame. The use of bytes 180 and 185 allows easy determination of the records in each frame.

Of the 4 remaining bytes, the first two of those bytes 190 indicate the frame size in numbers of bytes. The third of those bytes 195 contains flags. For example, byte 195 preferably contains a flag indicating whether the current frame is the last frame for bitstream 10. In the preferred embodiment, the last byte 200 is reserved.

The 20 bytes shown in FIG. 2 refer to the fixed length and fixed format portion of the frame header. In addition, as explained above, if a host processor has a data structure which is not the same as that used for framing, the frame header can also contain fill bytes to preserve alignment of the frames with the bitstreams.

FIG. 3 is a detailed representation of a record header. As FIG. 3 shows, each record header has two portions: a fixed length and format section 300 and a fill area 307.

Fixed format section 300 is preferably five bytes long. The first two of those bytes 302 contain the record data length expressed in units of the host processor data structure. For example, a host processor's units can be words, bytes (either eight bits long or some other length), blocks, etc.

The next two bytes 304 contain the record number relative to the first record in the frame. With this identification, each record in a frame can be uniquely identified. For truncated frames with only one record, this value will be zero.

The last byte 306 is a record flag. The first four bits of byte 306 are used for segmentation control. Primary segmentation refers to how the frames are originally formed, and secondary segmentation refers to packaging of frames. Bitstreams are often larger than individual frames. In such a situation, each frame will contain the beginning, end, or middle segment of a bitstream. For primary segmentation, the initial bits of byte 306 are used to indicate whether, when bitstream 10 is originally framed, the corresponding frame contains the first, last or middle segment. If no bits are set, then the record has not been segmented and is complete.

If, after framing, a bitstream is repacked, there may be further "segmentation." The secondary segmentation flag in byte 306 identifies whether there is any secondary segmentation and if so, whether the frame relates to a first, last or middle segment of this secondary segmentation.

The other flags in byte 306 indicate whether the particular record referred to is the last record in a frame and also what the record type is. Preferably, records can either be data records, host dependent file header records, index records, record keys, deleted record markers, fill records, or lost records. If the length of a data record is zero, that record is considered an empty record. The data records, deleted records and lost record types are numbered.

A "record key" record type contains an identification code to allow indexing of the data in the record. Key string identification may be used to sort or access information in the record. The use of key string is optional.

As explained previously, the fill area 307 provides alignment between a host processor and record. If the host processor is byte-oriented (assuming 8-bit bytes), no fill area is needed.

Figure 4:
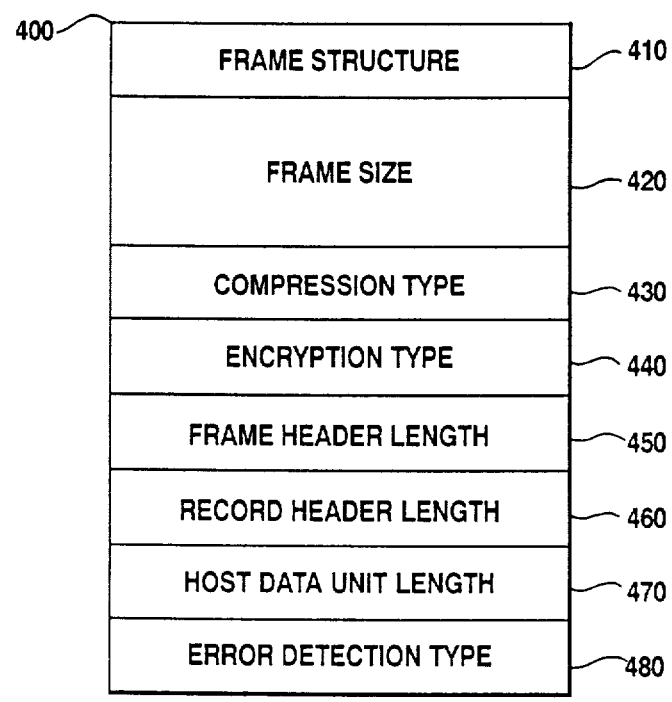
FIG. 4 is a diagram of a frame directory.

FIG. 4 shows an example of the frame directory 400 containing information about the frames. Generally, a copy of this directory is stored with the frames and a copy is loaded to a processor for accessing the framed bitstream. The frame directory specifies certain parameters for all frames of a bitstream. As shown in FIG. 4, the first parameter 410 is the frame structure type and is preferably 8 bits long. The frame structure type parameter indicates whether there is any framing at all, or whether the particular bitstream has not been framed.

The next parameter 420 is the frame size in bytes. In FIG. 4, this parameter is indicated as being 16 bits long and refers to all the frames except the last frame. A typical frame size range is between 32 and 64 kilobytes.

The next parameter 430 indicates the type of compression, and the entry in the directory for this parameter is preferably eight bits. This parameter indicates whether data compression has occurred, and if so, what scheme was used. Data compression, if it occurs, only applies to the data in a frame, and not to the fill bits or header information.

The following entry in the directory, parameter 440, indicates the type of encryption, if any. This parameter 440 is also eight bits.

The next three parameters refer to lengths. Parameter 450 indicates the frame header length and is preferably eight bits long. The total length of the frame header is the fixed length plus the fill area. As explained previously, for byte-oriented host machines, there is no need for a fill area, so the frame header length is preferably twenty bytes. The next parameter 460, the record header length, is also eight bits long and indicates the total length of the record header, including the fill area. For byte-oriented machines, again, there is no fill area, so the record header length would be set at five bytes.

The parameter 470, the host data unit length, is also eight bits long, and indicates the length of the data unit in the host, e.g., the byte or word length. Byte-oriented host usually have a value of eight, but this is not necessarily so. The length of the data area of the records, as explained above, is indicated in terms of this unit.

The last parameter 480 in the frame directory is the type of error detection and is also eight bits long. This entry is used to indicate the type of error detection or correction algorithm used. If this entry is zero, then there is no error detection or correction.

The method of the present invention provides the machine independence that unformatted bitstreams because such bitstreams can be easily constructed. The invention, however, avoids the disadvantages of conventional methods since the entire bit stream need not be read into memory each time to obtain individual records, and the entire bitstream is not lost due to single unrecoverable errors. With the present invention, a single unrecoverable error will at most merely cause a loss of data in a single frame containing that error.

It will be apparent to persons of ordinary skill in the art that modifications and variations can be made to the present invention. The invention in its broader aspects is therefore not limited to the specific details and illustrative examples shown and described. Accordingly, departure may be made from such details without departing from the spirit or scope of the general inventive concept.

What is claimed is:

1. A method of formatting a bitstream composed of a very large number of bits, the method comprising the steps of:

grouping said bits from said bitstream into a plurality of sequentially organized frames of data, all of said frames having the same capacity, except a last one of said frames being capable of having a smaller capacity;

placing a frame header into each of said frames.

placing into said frame header ID information uniquely identifying the frame containing that frame header; and providing the capability for error detection for the data in each frame independently of the data in any other frames, thereby permitting salvage of data in any frames in which errors have not been detected.

2. The method of claim 1 wherein the step of placing ID information into said frame header includes the substeps of using as said ID information, a value indicating the relative displacement of the frame containing the frame header in the sequential order of said frames containing the bitstream, and placing in the frame header for the last frame in the sequential order of said frames a special last frame ID code.

3. The method of claim 1 wherein the step of placing a frame header in said frames includes the substep of setting said frame header in a fixed area at the beginning of the frames.

4. The method of claim 1 wherein the step of placing said frame header into said frames includes the substep of placing in said frame header a fixed format portion including said identifying information.

5. The method of claim 4 wherein the step of placing said frame header in said frames also includes the substep of packing fill data into a fill portion of at least one of said frame headers.

6. The method of claim 1 wherein the step of grouping said bits into frames includes the substep of compressing said bits to form the data for said frames.

7. The method of claim 6 wherein the step of placing a frame header in said frames also includes the substeps of placing in said frame header a compression flag identifying the presence and type of data compression in said frames.

8. The method of claim 1 wherein said bitstream is organized into discrete units of bits and wherein said step of grouping bits into frames includes the substeps of filling each of said frames with an integral number of said discrete units, and adding fill bits to said frames when said frame size does not equal an integral number of said discrete units.

9. The method of claim 1 wherein said step of providing the capability of error detection includes the substep of placing in said frames an error detection code for indicating errors in the data of the frame into which the code is placed.

10. The method of claim 9 wherein said substep of placing an error detection code into said frames includes the substep of placing said error detection code at the end of said frames.

11. The method of claim 9 wherein said substep of placing an error detection code into said frames includes the substep of using said code to detect errors in all of the data in each frame, including the frame header.

12. The method of claim 1 wherein said step of placing said frame header in said frames includes the substep of including in said frame header an indication of the size of the frame containing that frame header.

13. The method of claim 1 wherein the step of placing said frame header in said frames includes the substep of inserting into said frame header an indication of the beginning of a data portion of the frame containing that frame header.

14. A method of formatting a bitstream composed of a very large number of bits, the method comprising the steps of:

grouping said bits from said bitstream into a plurality of sequentially organized frames of data, all of said frames having the same capacity, except a last one of said frames being capable of having a smaller capacity;

placing a frame header into each of said frames;

placing into said frame header ID information uniquely identifying the frame containing that frame header; and including in a data portion of said frames at least one record containing a record header and a record data portion.

15. The method of claim 14 wherein the step of placing ID information into said frame header includes the substeps of using as said ID information, a number indicating the number of the frame containing the frame header in the sequential order of said frames containing the bitstream, and placing in the frame header for the last frame in the sequential order of said frames a special last frame ID code.

16. The method of claim 14 wherein the step of placing a frame header in said frames includes the substep of setting said frame header in a fixed area at the beginning of the frames.

17. The method of claim 14 wherein the step of placing said frame header in said frames includes the substep of placing in said frame header a fixed format portion including said identifying information.

18. The method of claim 17 wherein the step of placing said frame header into said frames also includes the substep of packing fill data into a fill portion of at least one of said frame headers.

19. The method of claim 14 wherein the step of grouping said bits into frames includes the substep of compressing said bits to form the data for said frames.

20. The method of claim 19 wherein the step of placing a frame header in said frames also includes the substeps of placing in said frame header a compression flag identifying the presence and type of data compression in said frames.

21. The method of claim 14 wherein said bitstream is organized into discrete units of bits and wherein said step of grouping bits into frames includes the substeps of filling each of said frames with an integral number of said discrete units, and adding fill bits to said frames when said frame size does not equal an integral number of said discrete units.

22. The method of claim 14 including the step of providing the capability of error detection for the data in each frame independently of the data in any other frames, thereby permitting salvage of data in any frames in which errors have not been detected.

23. The method of claim 22 wherein the step of providing error detection capability includes the substep of placing in said frames, an error detection code for indicating errors in the data of the frame into which the code is placed.

24. The method of claim 23 wherein said substep of placing an error detection code into said frames includes the substep of placing said error detection code at the end of said frames.

25. The method of claim 23 wherein said substep of placing an error detection code into said frames includes the substep of using said code to detect errors in all of the data in each frame, including the frame header.

26. The method of claim 14 wherein said step of placing said frame header in said frames includes the substep of including in said frame header an indication of the size of the frame containing that frame header.

27. The method of claim 14 wherein the step of placing said frame header in said frames includes the substep of inserting into said frame header an indication of the beginning of a data portion of the frame containing that frame header.

28. The method of claim 14 wherein the step of placing said frame header in said frames includes the substep of inserting into said frame header an indication of the first and last ones of said records.

29. The method of claim 14 wherein the step of including at least one record in said frames includes the substep of placing a record ID into each of said record headers to identify the record containing that record header.

30. The method in claim 29 wherein the substep of placing said record ID into said record headers includes the substep of using as a record ID a number indicating the relative location of the record containing that record header in the one of said frames containing that record.

31. The method of claim 14 wherein the step of including at least one record in said frames includes the substep of including in each record header information about the record containing that record header.

32. The method in claim 29 wherein the bitstream was generated by a host processor, and
wherein the substep of placing said record ID into said record headers includes the substep of including information indicating the length of the subunits of data used by said host processor.

33. The method in claim 29 wherein the substep of placing said record ID into said record headers includes the substep of including flag information indicating what portion of the bitstream is contained in the record containing that record header.

34. The method in claim 29 wherein the substep of placing said record ID into said record headers includes the substep of including flag information indicating the type of the record containing that record header.

35. The method in claim 29 wherein the substep of placing said record ID into said record headers includes the substep of including flag information indicating whether the record containing that record header is the last of the records in the frame containing that record.

36. The method of claim 14 wherein the step of including at least one record in said frames includes the substep of placing portions of said bitstream into said record data portions.

37. A method of formatting bitstreams into a plurality of frames each containing a frame header including information about that frame, the method comprising the steps of:
building a frame directory for each of said bitstreams;
placing into the frame directory for each of said bitstreams an entry corresponding to the frames in that bitstream; and
placing in said frame entry an ID and a location for the frame for that entry.

38. The method of claim 37 further including the steps of: formatting said bitstreams using a host processor, and forming said frame directory using said host processor.

39. The method of claim 37 further including the steps of storing said formatted bitstream on a storage device, and storing said frame directory on said storage device.

40. The method of claim 37 wherein the step of placing the entry into said frame directory includes the substep of placing into said frame directory for said entry an indication of whether framing has been performed.

41. The method of claim 37 wherein the step of placing entries into said frame directory for each frame includes the substep of placing into said frame directory for each of said entries the size of the frame corresponding to that entry.

42. The method of claim 37 wherein the step of placing entries into said frame directory for each frame includes the substep of placing into said frame directory for each of said entries an indication of whether data compression has been performed for data in the frame corresponding to that entry.

* * * * *